(12) United States Patent
Chapman et al.

(10) Patent No.: US 7,139,923 B1
(45) Date of Patent: Nov. 21, 2006

(54) TECHNIQUE FOR SYNCHRONIZING NETWORK DEVICES IN AN ACCESS DATA NETWORK

(75) Inventors: John T. Chapman, Cupertino, CA (US); Daniel W. Crocker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 09/894,864

(22) Filed: Jun. 27, 2001

(51) Int. Cl.
*G06F 1/04* (2006.01)
(52) U.S. Cl. .................................... 713/400; 713/503
(58) Field of Classification Search ........ 713/400–501, 713/503, 600
See application file for complete search history.

(56) References Cited

U.S. PATENT DOCUMENTS

| | | | |
|---|---|---|---|
| 5,963,557 A | | 10/1999 | Eng |
| 6,023,769 A | * | 2/2000 | Gonzalez .................... 713/400 |
| 6,078,595 A | * | 6/2000 | Jones et al. ................. 370/503 |
| 6,490,727 B1 | | 12/2002 | Nazarathy et al. |
| 6,556,591 B1 | * | 4/2003 | Bernath et al. ............. 370/509 |
| 6,698,022 B1 | * | 2/2004 | Wu ............................. 725/111 |
| 6,763,032 B1 | * | 7/2004 | Rabenko et al. ............ 370/442 |
| 2002/0136203 A1 | | 9/2002 | Liva et al. |

OTHER PUBLICATIONS

Cable Television Laboratories, Inc., Interim Specification, "Data-Over-Cable Service Interface Specifications, Radio Frequency Interface Specification, SP-RFIv1.1-I02-990731," Jul. 30, 1999, 352 Pages.
Office Action mailed Sep. 19, 2005, Application No. 09/894,958.

* cited by examiner

*Primary Examiner*—Dennis M. Butler
(74) *Attorney, Agent, or Firm*—Beyer Weaver & Thomas, LLP; Dean E. Wolf, Esq.

(57) ABSTRACT

A master clock reference signal may be provided to selected packet fiber nodes in order to synchronize the local clock reference signals generated at selected devices in a cable network. In this way, selected portions of the cable network may be synchronized to a common timing reference signal. Additionally, synchronized timestamp information may also be provided to selected network devices in order to achieve synchronization of timestamps across a selected portion of the cable network.

81 Claims, 9 Drawing Sheets

TECHNIQUE FOR SYNCHRONIZING NETWORK DEVICES IN AN ACCESS DATA NETWORK

RELATED APPLICATION DATA

The present application is related to U.S. patent application Ser. No. 09/490,761, filed on Jan. 24, 2000, and U.S. patent application Ser. No. 09/606,503, filed Jun. 28, 2000, which claims priority under 35 USC 119(e) from U.S. Provisional Patent Application Ser. No. 60/159,085, filed on Oct. 13, 1999. The present application is also related to U.S. patent application Ser. No. 09/894,958, filed concurrently herewith, naming John Chapman as inventor. Each of these applications is incorporated herein by reference in its entirety for all purposes.

BACKGROUND OF THE INVENTION

The present invention relates to digital computer network technology. More specifically, it relates to a technique for synchronizing network devices in an access data network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

FIG. 1 shows a block diagram of a conventional two-way hybrid fiber-coaxial (HFC) cable network 100. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc. Additionally, as shown in FIG. 1, the Head End complex 102 typically includes a Cable Modem Termination System (CMTS). Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet. The cable modems typically reside at the subscriber premises 110A–D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I06-001215, Dec. 15, 2000). That document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A–D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

Typically, digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End Complex of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

Typically, the use of RF modulated optical signals in a conventional cable network only allows for very narrow opportunities to transmit IP packets. This is because most of the bandwidth of the RF modulated optical signal is used for DOCSIS related signaling between the Head End Complex 102 and plurality of cable modems. As a result, most conventional cable networks are not equipped to handle increased data flows relating to new and emerging broadband network applications such as video-on-demand, telephony, etc.

Accordingly, there exists a continual need to improve access network configurations in order to accommodate new and emerging network applications and technologies.

SUMMARY OF THE INVENTION

According to specific embodiments of the present invention, various methods, computer program products, and systems are disclosed for synchronizing devices in an access network. The access network includes a Head End Complex and a plurality of end nodes which utilize at least one upstream channel and at least one downstream channel for communicating with the Head End Complex. The access network further includes a plurality of fiber nodes interposed between the Head End Complex and the plurality of end nodes. Each fiber node is configured to communicate with the Head End Complex and the plurality of end nodes via the upstream and downstream channels. According to a specific embodiment, at least a portion of the end nodes and fiber nodes each include local clock circuitry for generating a local clock signal. In a specific implementation of the invention, a common clock reference signal is provided to the local clock circuitry in selected network devices to thereby cause each of the selected network devices to be synchronized to the common clock reference signal. In one embodiment, the common clock reference signal is distributed to the selected network devices via a first downstream channel.

Other embodiments of the present invention are directed to methods, computer program products, and systems for synchronizing devices in an access network. The access network includes a Head End Complex and a plurality of end nodes which utilize at least one upstream channel and at least one downstream channel for communicating with the Head End Complex. The access network further includes a plurality of fiber nodes interposed between the Head End Complex and the plurality of end nodes. Each fiber node is configured to communicate with the Head End Complex and the plurality of end nodes via the upstream and downstream channels. The plurality of fiber nodes includes an RF fiber node and a packet fiber node. The packet fiber node includes a distributed cable modem termination system (DCMTS). According to a specific embodiment, at least a portion of the end nodes and fiber nodes each include local clock circuitry for generating a local clock signal. A common clock reference signal is received at a first packet fiber node. Using the common clock reference signal, a local clock signal is generated at the first packet fiber node which is synchronized with the common clock reference signal. The local clock signal is then provided to components at the first packet fiber node, including the DCMTS.

Other embodiments of the present invention are directed to methods, computer program products, and systems for synchronizing devices in an access network. The access network includes a Head End Complex and a plurality of end nodes which utilize at least one upstream channel and at least one downstream channel for communicating with the Head End Complex. The access network further includes a plurality of fiber nodes interposed between the Head End Complex and the plurality of end nodes. Each fiber node is configured to communicate with the Head End Complex and the plurality of end nodes via the upstream and downstream channels. The plurality of fiber nodes includes an RF fiber node and a packet fiber node. The packet fiber node includes a distributed cable modem termination system (DCMTS). According to a specific embodiment, at least a portion of the end nodes and fiber nodes each include local clock circuitry for generating a local clock signal. Additionally, at least a portion of the fiber nodes each include local timestamp circuitry for generating local timestamp information. Timestamp synchronization information is received at a first packet fiber node. Using the timestamp synchronization information, local timestamp information is generated at the first packet fiber node which is synchronized with the timestamp synchronization information.

According to specific embodiments of the present invention, local clock reference signals generated at selected network devices may be synchronized to a common clock frequency. Additionally, according to specific embodiments of the invention, local timestamps generated at selected network devices may also be synchronized. In specific embodiments where the present invention is implemented in a cable network, local clock signals generated at selected DCMTS devices may be synchronized to a national clock such as, for example, a Stratrum 1. Additionally, by providing synchronized timestamp information to selected DCMTS devices in the cable network, local timestamps generated at the selected DCMTS devices may also be synchronized.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 2A:
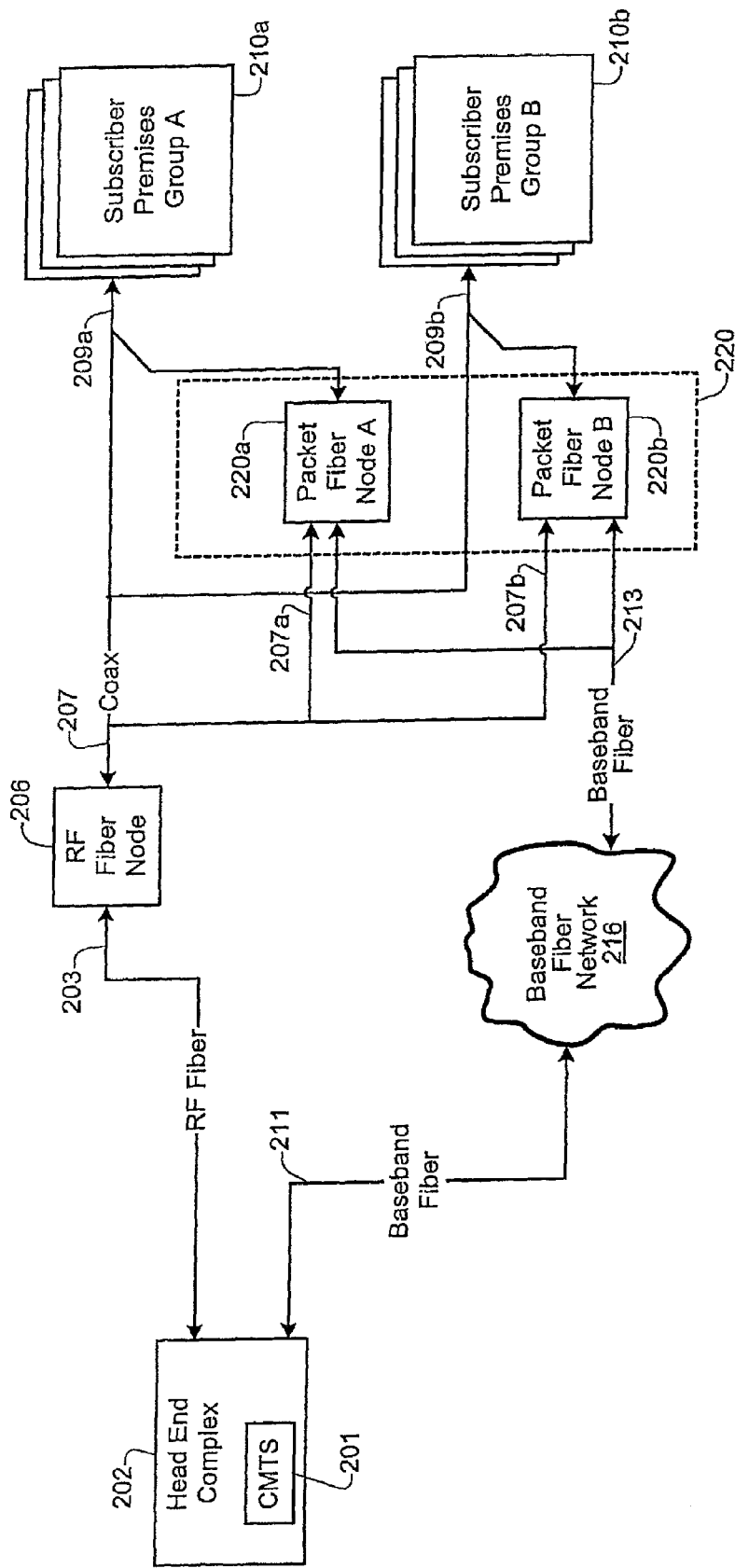
FIGS. 2A and 2B illustrate specific embodiments of cable networks which may be used for implementing the synchronization technique of the present invention.
Figure 2B:
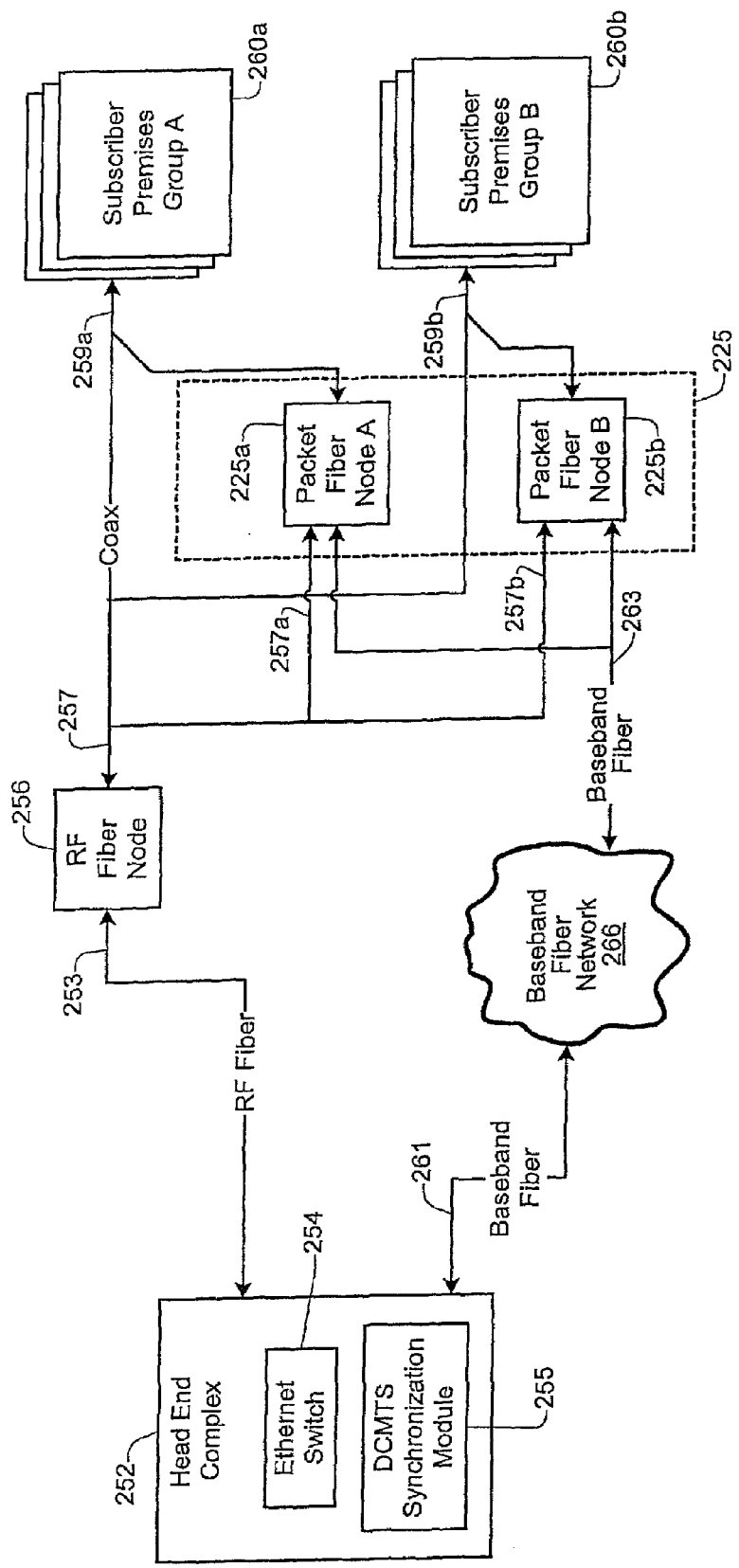

FIGS. 2A and 2B illustrate specific embodiments of cable networks which may be used for implementing the synchronization technique of the present invention. In the embodiment of FIG. 2A, the Head End complex 202 includes a centralized CMTS device 201 which may be configured to implement DOCSIS functionality. A specific embodiment of the CMTS 201 is described in greater detail below with respect to FIGS. 7 and 8 of the drawings.

Figure 1:
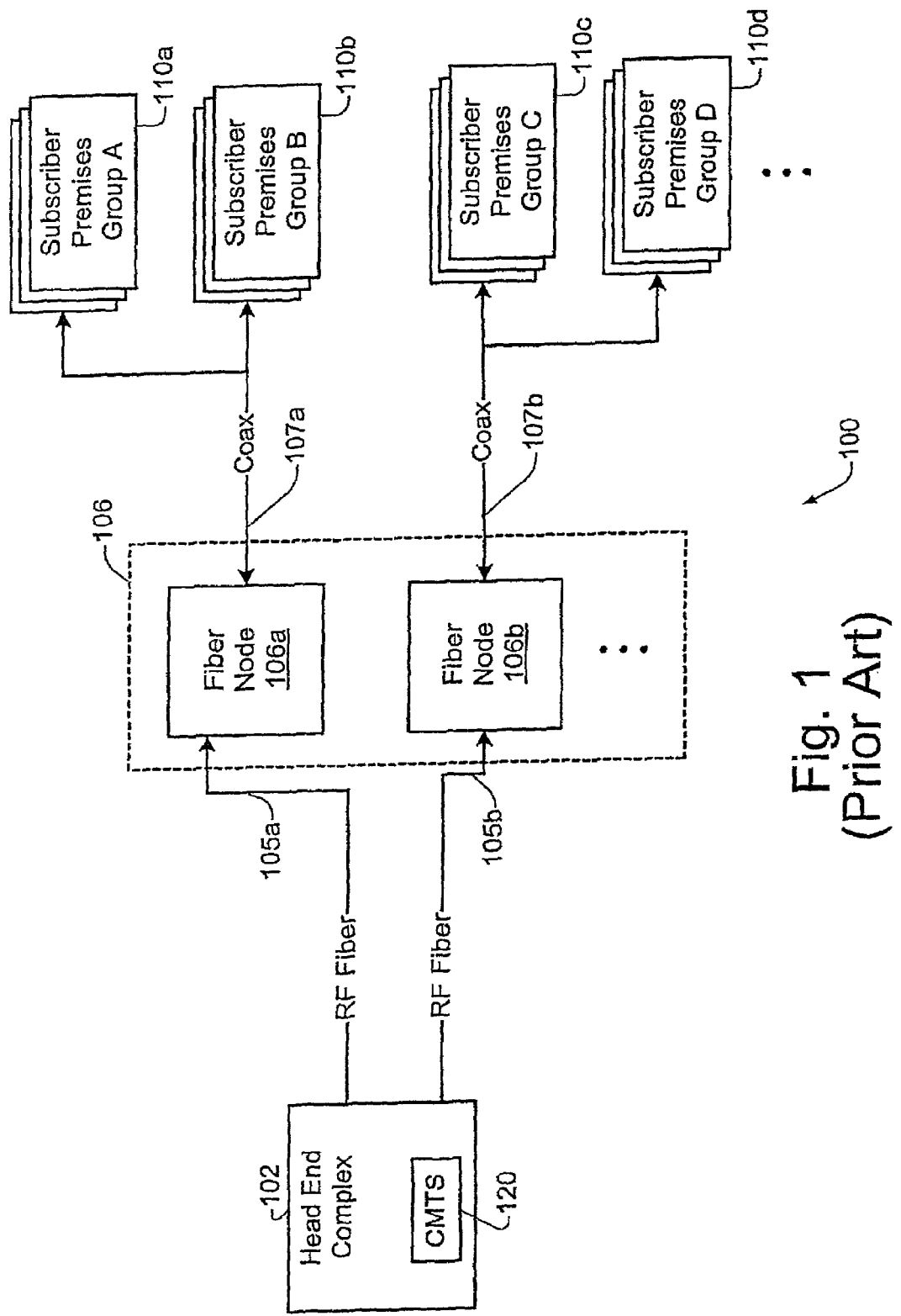
FIG. 1 shows a block diagram of a conventional two-way hybrid fiber-coaxial (HFC) cable network 100.

As show in FIG. 2A, the cable network 200 includes two different types of fiber nodes, namely RF fiber nodes (e.g. 206), and packet fiber nodes (e.g. 220a, 220b). According to a specific embodiment, the RF fiber node 206 may be configured as a conventional fiber node such as fiber nodes 106 of FIG. 1. According to a specific implementation, the RF fiber node 206 may be configured to handle all legacy RF downstream and upstream communications (such as, for example, set-top box signals, telemetry signals, etc., and communications which occur on centralized DOCSIS channels), and may be configured to perform additional functions associated with conventional fiber nodes.

As shown in the embodiment of FIG. 2A, a baseband fiber network 216 may be deployed which is coupled to the conventional cable network. The baseband fiber network may include a plurality of packet fiber nodes 220, which are also coupled to the conventional fiber network. Each packet fiber node may be inserted into the cable network 200 using a combiner and/or splitter which may be used to add and/or separate DOCSIS signals into/from the RF lineup.

Communication between the Head End Complex 202 and the plurality of packet fiber nodes 220 may be accomplished via the baseband fiber network 216. For example, according to a specific implementation, one or more IP tunnels may be formed between the Head End Complex 202 and the plurality of packet fiber nodes 220 in order to allow for transmission and reception of IP packets. In a specific implementation, the IP tunnel(s) may be formed between the CMTS 201 and a DCMTS (residing at one or more packet fiber nodes). The CMTS 201 may be configured to handle layer 3 functionality, including packet-related decisions, network layer decisions, IP related decisions, etc. Additionally, according to a specific implementation, the CMTS may also be responsible for handing redundancy and/or failover functionality for selected DCMTS devices.

According to specific embodiments of the present invention, each packet fiber node may include a distributed CMTS device (herein referred to as a "DCMTS"), which is configured to receive and transmit baseband optical signals from/to the Head End Complex 202 via baseband fiber network 216. According to a specific implementation, the DCMTS may be configured to perform conversions between packet protocols implemented over the baseband fiber media (e.g. 211, 213) and DOCSIS protocols implemented on the coax media (e.g. 209a, 209b). According to a specific embodiment, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the Head End complex. Additionally, the DCMTS may be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc.

According to a specific implementations of the present invention, the packet fiber nodes may be pushed deeper into the network (i.e. closer to the subscriber groups) than conventional RF fiber nodes, which, as illustrated in FIG. 2A, may result in a plurality of packet fiber nodes 220 servicing subscriber groups (e.g. 210a, 210b) which are serviced by a single RF fiber node 206. For example, the RF fiber node 206 may be configured to service 200 households past (HHP) while each packet fiber node may be configured to service 100 households past, resulting in 2 packet fiber nodes (220a, 220b) servicing the 200 households which are serviced by the RF fiber node 206.

In addition to being configured to receive baseband optical signals, the packet fiber nodes 220 may also be configured to receive electrical signals from the RF fiber nodes via coax lines (e.g. 207A, 207B). As explained in greater detail below with respect to FIGS. 5 and 6 of the drawings, such electrical signals may include clock or other timing reference signals and/or timestamp synchronization signals.

FIG. 2B shows an alternate embodiment of a cable network 250 which may be used for implementing the synchronization technique of the present invention. In the cable network of FIG. 2B, the centralized CMTS typically residing at the Head End complex 252 has been removed, and its functionality incorporated into selected DCMTS devices residing in the packet fiber nodes 225. Thus, according to the embodiment of FIG. 2B, selected DCMTS devices residing in the packet fiber nodes 225 may be configured to implement the functions typically implemented by the centralized CMTS device, such as, for example, layer 3 functionality and/or at least a portion of the functionality performed by the various logic described with respect to FIGS. 7 and 8 of the drawings.

According to a specific embodiment, communication of IP packets between the Head End complex 252 and the plurality of packet fiber nodes 255 may be accomplished without the use of a tunneling protocol. In such an embodiment, communication between network devices may be accomplished using, for example, a standardized IP protocol. Additionally, as shown in the embodiment of FIG. 2B, the Head End complex 252 may include an Ethernet switch 254 or other type of traffic handling device which may be configured to route or forward traffic between network devices in the cable network 250, or between the devices in the cable network and devices in external networks. Further, as explained in greater detail below with respect to FIG. 3, the Head End complex may also include a DCMTS Synchronization Module 255 which may be configured to provide synchronized clock reference signals and/or synchronized timestamp information to the plurality of packet fiber nodes 225.

Figure 3:
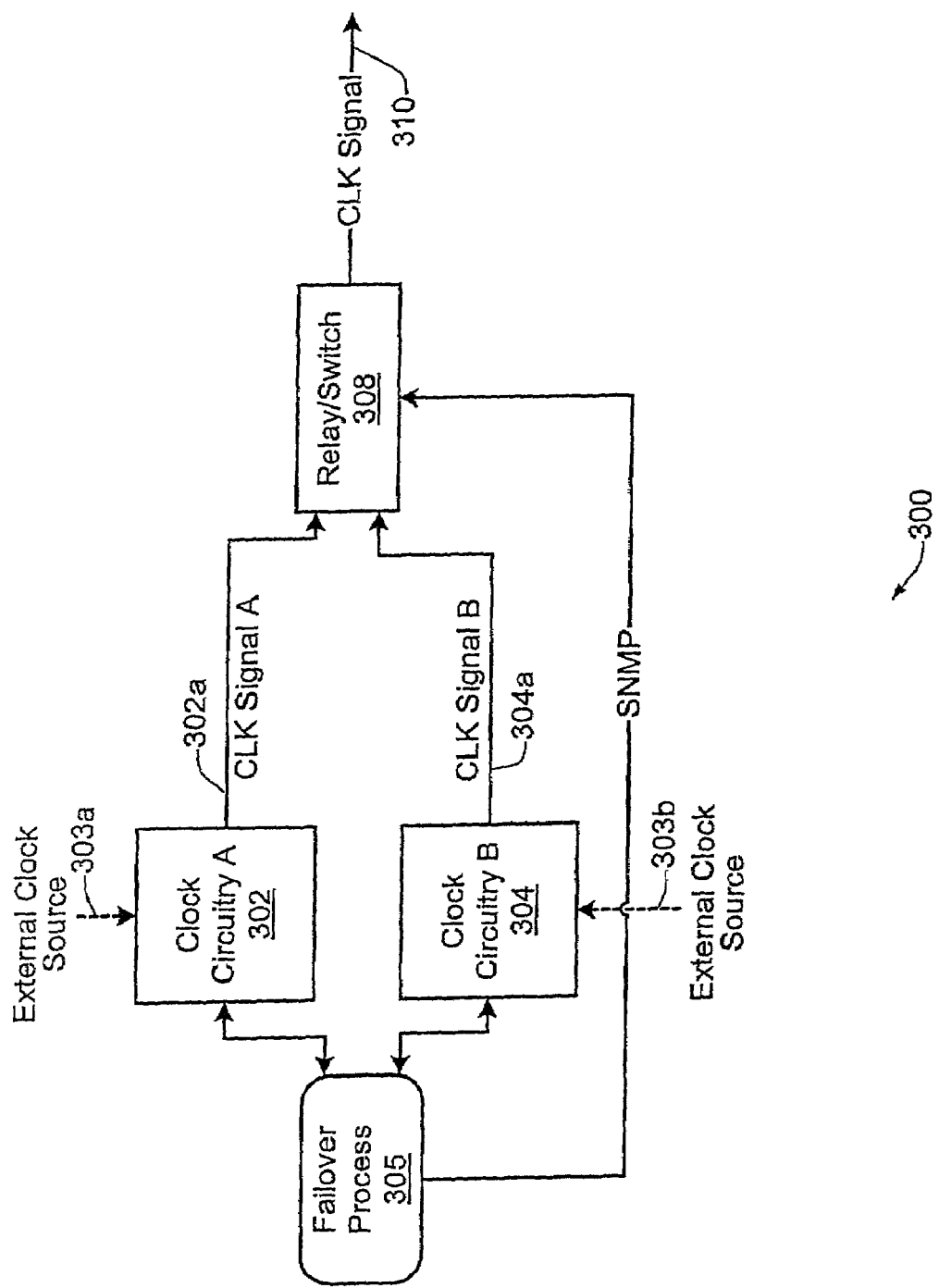
FIG. 3 shows a specific embodiment of a DCMTS Synchronization Module 300 in accordance with a specific embodiment of the present invention.

FIG. 3 shows a specific embodiment of a DCMTS Synchronization Module 300 in accordance with a specific embodiment of the present invention. According to specific embodiments, the DCMTS Synchronization Module may be configured as an internal component of a centralized or master CMTS device (e.g. 201), or may be configured as a separate system external to the centralized CMTS (as shown, for example, at 255 of FIG. 2B).

As shown in the embodiment of FIG. 3, the DCMTS Synchronization Module 300 may include appropriate hardware and/or software for implementing redundant clock circuitry in order to provide a master clock or timing reference signal to selected packet fiber nodes and their respective DCMTS devices.

According to specific embodiments, each DCMTS device may be configured to include its own clock circuitry for generating a respective internal timing reference signal to be used by other components of the DCMTS device. However, in embodiments where each DCMTS device is configured to include its own respective clock circuitry, the internal timing reference signals generated at each of the DCMTS devices will most likely not be synchronized with each other. This may be due, for example, to minor fluctuations and/or variances which are inherent in each independent clock circuit. Thus, although each DCMTS clock circuit will try to achieve the same frequency as the other DCMTS clock circuits, it is likely that the internal timing reference signals generated at the DCMTS devices will not be synchronized in frequency and/or phase.

By providing a master timing reference signal to selected DCMTS devices in the cable network, the clock signals generated by each of the selected DCMTS devices may be synchronized. Moreover, as explained in greater detail below, the synchronization technique of the present invention may also be used to synchronize timestamps across selected DCMTS devices and selected cable modems in the cable network.

As shown in the embodiment of FIG. 3, the DCMTS Synchronization Module 300 may include a plurality of redundant clock circuits (e.g. Clock Circuitry A 302 and Clock Circuitry B 304). One or more of the clock circuits may be adapted to receive clock signals or synchronization signals from an external source such as, for example, a Stratum 1 or a Stratum 3 clock source. In the embodiment of FIG. 3, Clock Circuitry A may be configured to generate a first clock signal (e.g. clock signal A) and clock circuitry B may be configured to generate a second clock signal (e.g. clock signal B). According to a specific embodiment, the clock signals generated by each of the clock circuitry devices may be synchronized in phase as well as frequency. In a specific implementation, where the DCMTS Synchronization Module is implemented in a DOCSIS network operating at a root frequency (e.g. 10.24 MHz), the frequency of the clock signals generated by each of the clock circuitry devices 302, 304 may be any harmonically related frequency or integer multiple of the root frequency. For example, according to a specific embodiment, the frequency of clock signal A and clock signal B may each be equal to 20.48 MHz.

It will be appreciated that in most DOCSIS HFC networks, the downstream frequency spectrum below 54 MHz is typically unused. Thus, according to specific embodiments of the present invention, the frequency n of the master clock reference signal should preferably be less than 54 MHz.

As shown in the embodiment of FIG. 3, the redundant clock signals (e.g. clock signal A, clock signal B) are fed to a relay or switch 308 which is controlled by a failover process 305. According to a specific embodiment, control of the relay/switch circuit 308 may be implemented using a conventional communication protocol such as, for example, SNMP.

The failover process 305 monitors the health of each clock circuit 302, 304. According to a specific embodiment, one of the clock circuits (e.g. clock circuitry A) may be configured as the primary clock circuit, and the other clock circuit (e.g. clock circuitry B) may be configured as a backup or redundant clock circuit. During times when the failover process 305 detects that the primary clock circuit is operating normally, the failover process may cause the relay 308 to output the clock signal from the primary clock circuit on line 310. During times when the failover process 305 detects a failure at the primary clock circuit, the failover process may then cause the relay 308 to switch its output clock signal to the backup clock signal generated by the backup clock circuit.

According to a specific implementation, the output clock signal on line 310 may correspond to a sine wave having the frequency of n MHz. For purposes of illustration, it will be assumed that the value n=20.48. As explained in greater detail below, the output clock signal will eventually be distributed to selected packet fiber nodes in the cable network in order to synchronize the phase and/or frequency of the local clock signals generated at each of the selected packet fiber nodes.

Figure 5:
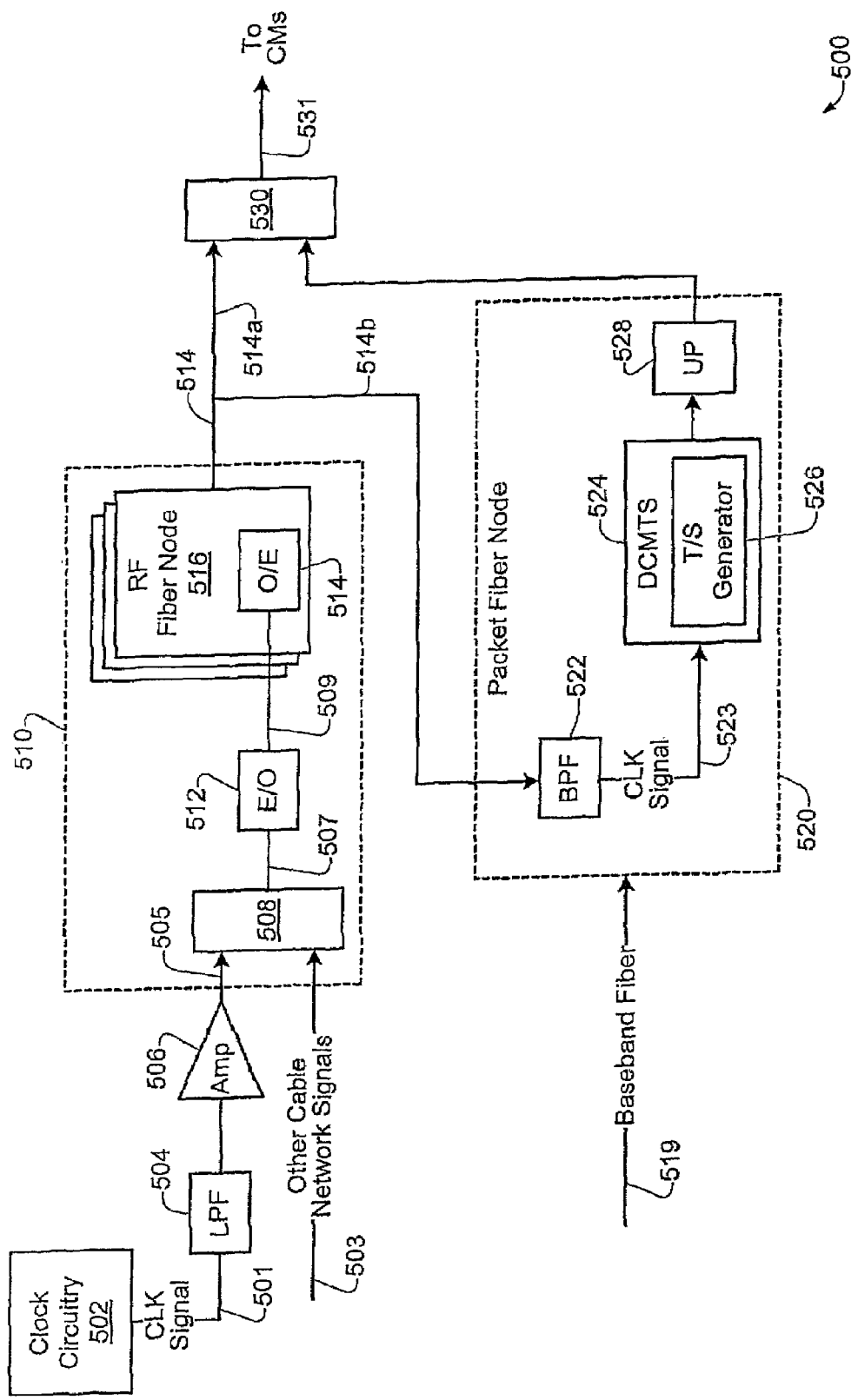
FIG. 5 shows a block diagram of various components of a cable network 500 which may be used for implementing the synchronization technique in accordance with a specific embodiment of the present invention.

FIG. 5 shows a block diagram of various components of a cable network 500 which may be used for implementing the synchronization technique in accordance with a specific embodiment of the present invention. For purposes of illustration, it is assumed that the network 500 of FIG. 5 is used to transmit a master clock reference signal to selected packet fiber nodes in the cable network.

The master clock reference signal may originate at clock circuitry block 502. According to a specific implementation, the clock circuitry block 502 may reside at the Head End complex of the cable network, and may include various logic described in the DCMTS Synchronization Module of FIG. 3.

The clock circuitry 502 is configured to generate a clock reference signal having a frequency of n MHz on line 501. This clock reference signal may then be passed through a low pass filter 504 and an amplifier 506. According to a specific embodiment, the amplifier 506 may correspond to an RF amplifier which is configured to output a sine wave of n MHz on line 505. The clock reference signal on line 505 is then combined with other cable network signals at a combiner 508.

The combined signals, which include the master clock reference signal of n MHz are transmitted to one or more RF fiber nodes 516. In a specific embodiment, where the synchronization technique of the present invention is implemented in a conventional cable network, the combined signals are passed from the combiner 508 via a coax cable 507 to an electrical-optical converter 512 which converts the signals into RF modulated optical signals to be transmitted to the RF fiber nodes 516 via RF fibers 509. At the RF fiber node, the combined downstream signals are converted back into electrical signals and output onto coax line 514. As shown in the embodiment of FIG. 5, one or more packet fiber nodes 520 may be configured to receive the downstream signals on coax line 514.

At the packet fiber node 520, the combined downstream signals are passed through a band pass filter 522 which is configured to extract out the master clock reference signal of n MHz. The master clock reference signal is then passed to the DCMTS device 524, whereupon the master clock reference signal frequency of n MHz is used to accurately drive the timestamp generator 526. The timestamp information generated by the timestamp generator 526 is then passed via an up converter 528 to a combiner 530 which combines the timestamp information signals with the other downstream signals from line 514 to be output to a selected group of cable modems. According to a specific embodiment, the DCMTS 524 is configured to handle the timestamp functionality conventionally implemented at the centralized CMTS. Such timestamp functionality may include, for example, generating and transmitting modulated timestamp signals to selected cable modems in the cable network.

Using the technique of the present invention as described, for example, in FIG. 5, a master clock reference signal may be provided to selected packet fiber nodes in order to synchronize the local clock reference signals generated at the selected packet fiber nodes and/or the selected DCMTS devices associated with each packet fiber node. Thus, the technique of the present invention provides a master reference signal for synchronizing each of the internal reference timing signals at selected DCMTS devices. According to a specific embodiment, each clock circuit residing at a DCMTS device may be configured to be a slave to the master timing reference signal generated at the Head End complex of the cable network. In this way, selected portions of the cable network may be synchronized to a common timing reference signal.

Figure 6:
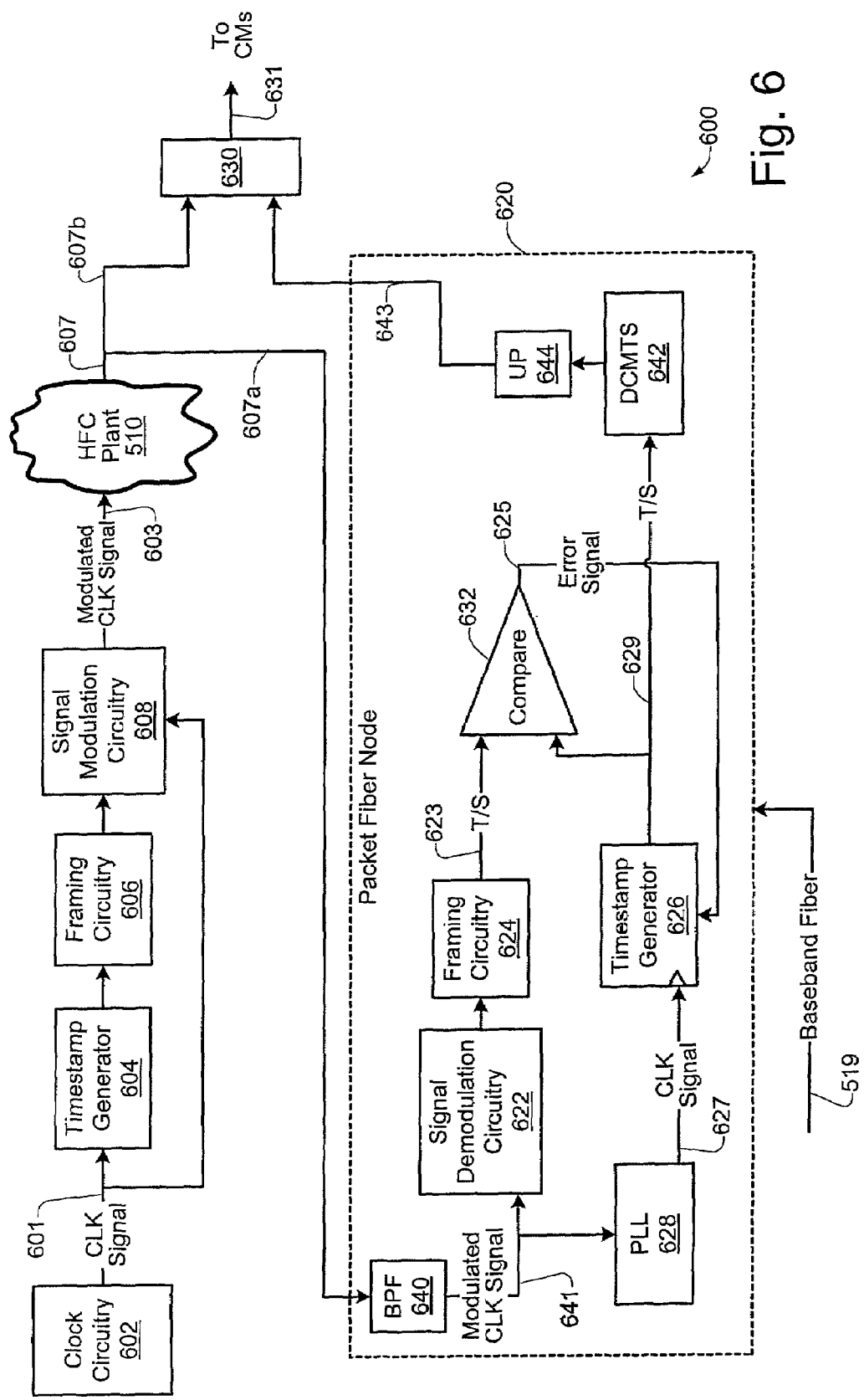
FIG. 6 shows an alternate embodiment of a portion of a cable network 600, illustrating various components which may be used for implementing an alternate embodiment of the synchronization technique of the present invention.

FIG. 6 shows an alternate embodiment of a portion of a cable network 600, illustrating various components which may be used for implementing an alternate embodiment of the synchronization technique of the present invention. As shown in the embodiment of FIG. 6, a master timing reference signal (e.g. clock reference signal) is distributed to selected packet fiber nodes. Additionally, synchronized timestamp information is also provided to selected packet fiber nodes in order to achieve synchronization of timestamps across network devices in a selected portion of the cable network. According to a specific embodiment, the synchronization of timestamps at the packet fiber nodes results in the synchronization of timestamps generated at selected cable modems in the cable network. Since the timestamps may also be used for scheduling of packet traffic, the scheduling of packet traffic may also be synchronized across selected portions of the cable network.

It will be appreciated that if no synchronized timestamp information were distributed to packet fiber nodes in the cable network, each packet fiber node would generate its own timestamp according to its respective local time base. In such a situation, there would be no guarantee that any of the packet fiber nodes or DCMTS devices would have synchronized timestamps. However, by distributing synchronized timestamp information to each of the packet fiber nodes and/or DCMTS devices, synchronization of timestamps between selected DCMTS devices and cable modems may be achieved.

According to a specific embodiment, the synchronized timestamp information may be provided to various network components using a modulated carrier frequency. According to one implementation, the carrier frequency corresponds to the master timing reference signal or clock reference signal described previously with respect to FIG. 3 and FIG. 5.

As shown in FIG. 6, clock circuitry 602 is provided for generating a master timing reference or clock reference signal 601. According to a specific embodiment, the clock circuitry 602 may be implemented at the Head End complex of the cable network. Additionally, according to one implementation, the clock circuitry 602 may include various logic described in the DCMTS Synchronization Module of FIG. 3.

The clock circuitry 602 is configured to generate a master clock reference signal 601 having a frequency of n MHz, which is used to drive various componentry, including master timestamp generator 604 and signal modulation circuitry 608. The timestamp generator outputs timestamps to framing circuitry 606, which then passes the framed timestamp information to signal modulation circuitry 608. The signal modulation circuitry 608 utilizes the master clock reference signal and the framed timestamp information to generate a modulated clock reference signal which includes the timestamp information generated by master timestamp generator 604. According to a specific embodiment, the frequency of the modulated clock reference signal is the same as the frequency of the clock reference signal provided by clock circuitry 602, namely n MHz. The modulated clock reference signal (which includes the timestamp information) is then passed along with other downstream channel information to the HFC plant components 510 such as those described previously with respect to FIG. 5.

In a specific implementation, the master timestamp generator 604, framing circuitry 606, and signal modulation circuitry 608 may also reside at the Head End complex of the cable network. Additionally, according to a specific implementation, the timestamp generator, framing circuitry, and signal modulation circuitry may each be configured to function in accordance with the standardized DOCSIS protocol.

According to specific embodiments, the downstream channels, including the modulated clock reference signal are provided to one or more packet fiber nodes (e.g. 620). A band pass filter 640 may be used at the packet fiber node to extract the modulated clock reference signal from the other downstream signals. The modulated clock reference signal is then passed to a phase lock loop (PLL) device in order to recover the clock reference signal (e.g. n MHz frequency). The recovered clock reference signal is then used to drive the timestamp generator 626.

Additionally, the modulated clock reference signal is also passed to the signal demodulation circuitry 622 and framing circuitry 624 in order to recover the timestamp information embedded in the modulated clock reference signal. The recovered timestamp information is then used to synchronize the timestamp generator 626 with the master timestamp information generated by master timestamp generator 604. In this way, timestamps generated by selected fiber nodes may be synchronized with each other.

For example, as shown in the embodiment of FIG. 6, a comparitor 632 may be used to compare the master timestamp information to the timestamp information generated by timestamp generator 626. The comparitor 632 may generate an error signal 625 which is fed back to the timestamp generator 626 in order to cause the timestamps generated by timestamp generator 626 to be synchronized with the Master timestamp information. The output signal produced by the timestamp generator 626 on line 629 may then be used to feed other components in the packet fiber node.

As shown in the embodiment of FIG. 6, the timestamps generated by timestamp generator 626 are provided to DCMTS device 642. According to a specific implementation, the DCMTS device 642 may be configured to accept or utilize external timestamp information such as that generated by timestamp generator 626. According to an alternate embodiment, the DCMTS may be configured to include the timestamp generating circuitry illustrated in FIG. 6 such as, for example, timestamp generator 626, comparitor 632, etc. In this alternate embodiment, the DCMTS may be configured to utilize the master clock reference signal for driving its internal components, and may also be configured to utilize the master timestamp information to synchronize its internal timestamp generator with other timestamp devices in the cable network.

Timestamp signals as well as other DOCSIS signals may then be passed from the DCMTS device 642, via up converter 644, to combiner 630 whereupon the signals are then distributed along with the other downstream channel information to the cable modems.

Figure 4:
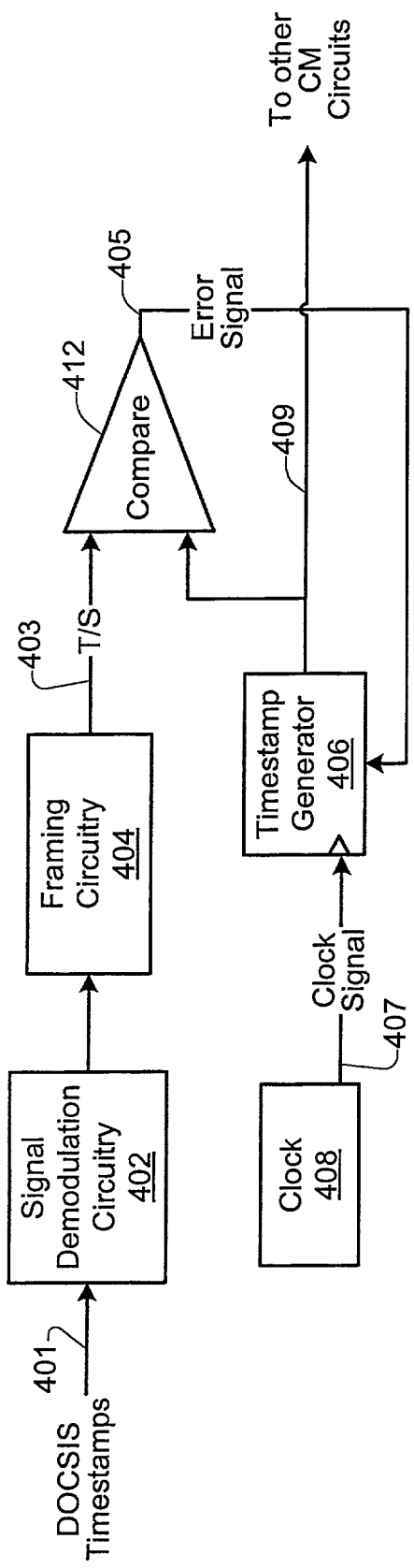
FIG. 4 shows a block diagram of various componentry which may reside within a cable modem implemented in accordance with a specific embodiment of the present invention.

FIG. 4 shows a block diagram of various componentry which may reside within a cable modem implemented in accordance with a specific embodiment of the present invention. In the embodiment of FIG. 4, it is assumed that the cable modem is configured to implement the standardized DOCSIS protocol. As shown in FIG. 4, the cable modem may include a local clock source 408 which is configured to provide a clock reference signal to a timestamp generator 406. According to a specific implementation, the timestamp generator 406 may be implemented using a counter. Additionally, according to one implementation, the frequency of the clock reference signal provided to the timestamp generator on line 407 is equal to 20.48 MHz.

As shown in FIG. 4, the cable modem also includes signal demodulation circuitry 402 which receives modulated DOCSIS timestamp information via coax line 401. The signal demodulation circuitry 402 demodulates the incoming timestamp signals, and passes the demodulated signals to framing circuitry 404, which extracts the timestamp information provided by an external entity (such as, for example, the Head End complex or fiber node servicing the cable modem). The timestamp information provided by the external entity is compared, at comparitor circuitry 412, to the timestamp information generated by timestamp generator 406. The comparitor 412 generates an error signal 405 which is fed back to the timestamp generator 406 in order to cause the timestamps generated by timestamp generator 406 to be synchronized with the timestamps generated by the external entity. The output signal produced by the timestamp generator 406 on line 409 is then used to feed the remaining cable modem circuits (not shown).

It will be appreciated that the cable modem circuitry described in FIG. 4 has been configured to receive external timestamp information in order to synchronize its internal timestamp generating circuitry. Moreover, in specific embodiments where timestamp information has been synchronized across a plurality of different fiber nodes, the timestamps generated at each of the cable modems serviced by such fiber nodes will also be synchronized.

It will be appreciated that by synchronizing the clock reference signals in each of the DCMTS devices to a common clock frequency, the upstream and/or downstream channels across each of the DCMTS devices may also be synchronized. Additionally, timestamps may also be synchronized across upstream and/or downstream channels associated with different DCMTS devices in the cable network. Further, by synchronizing timestamp information across selected DCMTS devices, channel MAP messages and transmission intervals may be valid across different DCMTS devices. Accordingly, cable modems may be allowed to switch between upstream and/or downstream channels associated with different DCMTS devices without having to obtain new timestamp information each time a channel change is performed between DCMTS devices.

It will also be appreciated that, by synchronizing the clock reference signal and/or timestamp information across different DCMTS devices in the cable network, a number of additional advantages may be realized. For example, using the synchronization technique of the present invention, cable modems may be load shared between different DCMTS devices in the cable network. Additionally, cable modems may also be load shared between a master CMTS device (e.g. residing at the Head End complex) and one or more DCMTS devices. Additionally, using the synchronization technique of the present invention, a master CMTS and distributed CMTS device are able to co-exist on the same HFC plant with overlapping upstream frequencies. Additionally, using the synchronization technique of the present invention, a national clock such as, for example, a Stratrum 1 clock may be provided to various components in the cable network in order to facilitate the synchronizing of voice over IP CODECS, and to generate DOCSIS timestamps having a high degree of accuracy (e.g. less than 5 ppm).

Additionally, the synchronization technique of the present invention allows a lower cost circuit to be used in the temperature hardened environment of the DCMTS for the upstream PLL. For example, according to specific implementations, it is preferable to provide to various devices in the cable network, a 5 ppm (or less) clock signal which is stable over full temperature, time, and voltage conditions. One implementation for meeting such requirements would be to provide a stand alone circuit at the packet fiber node. Another implementation would be to provide a clock circuit at the CMTS which then provides a stable clock reference to a PLL circuit in the DCMTS.

OTHER EMBODIMENTS

Generally, the synchronization technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 7:
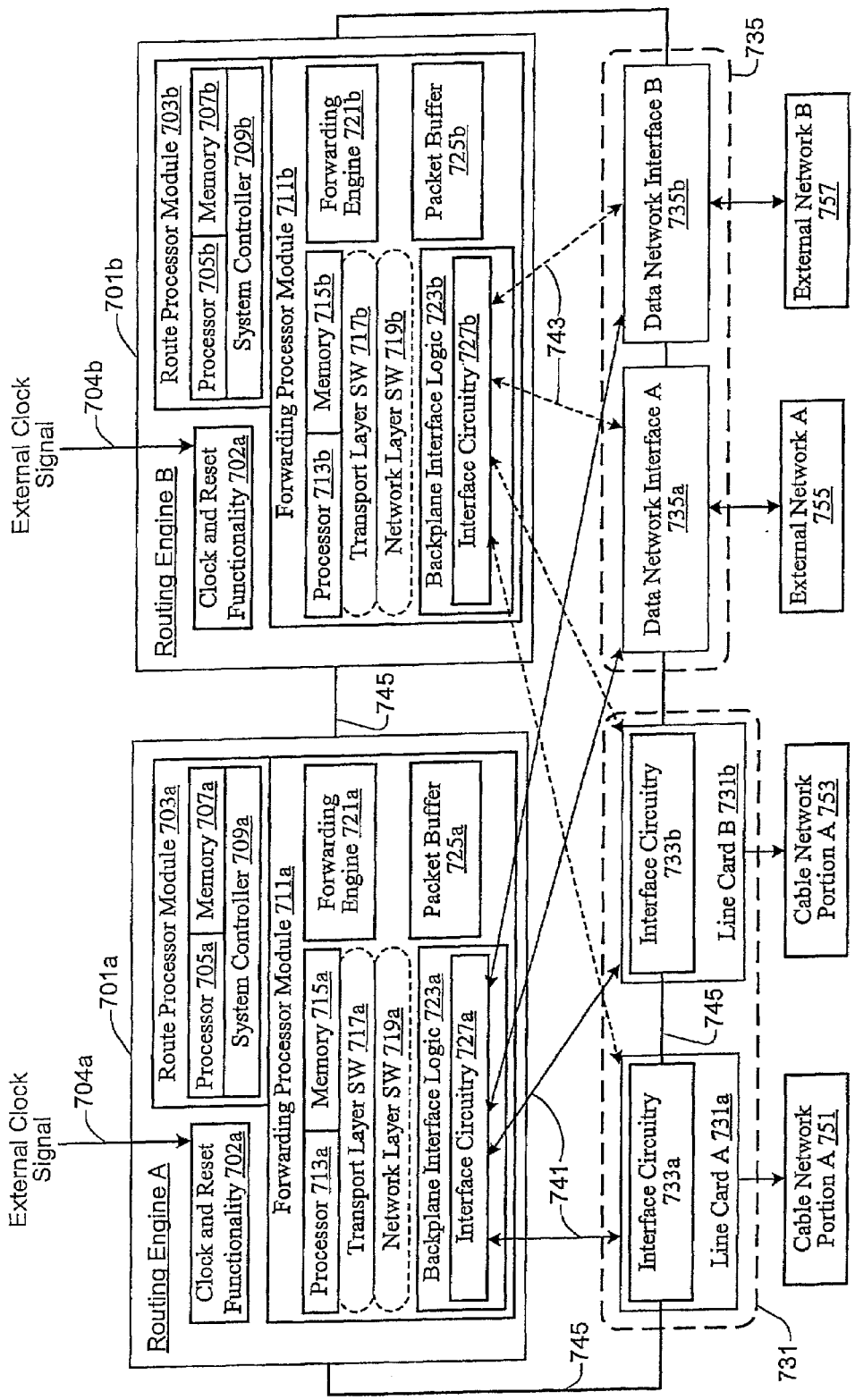
FIG. 7 shows a block diagram of a specific embodiment of a Cable Modem Termination System (CMTS) 700 which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701*a*, 701*b*). In a specific implementation, Routing Engine A 701*a* may be configured as a primary or working routing engine, while Routing Engine B 701*b* may be configured as a backup or standby routing engine which provides redundancy functionality.

As shown in the embodiment of FIG. 7, each of the routing engines may include a variety of similar modules and/or components. In order to avoid confusion, the various components and/or modules relating to Routing Engine A 701*a* will now be described in greater detail with the understanding that such descriptions may also be applied to the corresponding components and modules of Routing Engine B 701*b*.

According to a specific embodiment, Routing Engine A may be configured or designed to include a plurality of functionally different modules or components, including, for example, a Forwarding Processor (FP) Module 711*a* adapted to provide packet forwarding functionality; a Route Processor (RP) Module 703*a* adapted to implement routing or forwarding operations; a utility component 702*a* adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 707a may comprise synchronous dynamic random access memory (SDRAM) storage locations addressable by the processor 705a for storing software programs and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to a specific implementation, interface circuitry 727a may be configured to reside on a backplane logic circuit 723a of the routing engine. In one example, the backplane logic circuit 723a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 725a and a forwarding engine 721a of the FP Module 711a. The packet buffer 725a may include memory which is configured to store packets as the forwarding engine 721a performs its packet forwarding functions. For example, the packet buffer may be used to store low priority data packets while high priority, low latency voice packets are forwarded by the forwarding engine to a data network interface 735a. According to various embodiments, the FP Module 711 may comprise a processor 713a and memory 715a for handling transport layer 717 and network layer 719 functionality. In one implementation, the processor 713a may be configured to track accounting, port, and billing information for various users on a cable modem network 751. The processor 713a may also be configured to maintain desired service flow or session state information in memory 715a such as, for example, for voice calls initiated over the cable modem network. The FP Module 711a may also be configured to provide transaction compacting functionality, data parcel tunneling functionality, switching functionality, timestamp functionality, etc.

According to a specific implementation, Routing Engine A 701a may be connected to Routing Engine B 701b via at least one link 746, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

According to a specific embodiment, the plurality of line cards may include different types of line cards which have been specifically configured to perform specific functions. For example, line cards 731 may correspond to radio-frequency (RF) line cards which have been configured or designed for use in a cable network. Additionally, line cards 735 may correspond to network interface cards which have been configured or designed to interface with different types of external networks (e.g. WANs, LANs,) utilizing different types of communication protocols (e.g. Ethernet, Frame Relay, ATM, TCP/IP, etc). For example. the data network interface 735a functions as an interface component between external data sources and the cable system. The external data sources transmit data to the data network interface 735a via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 719a.

According to a specific implementation, the operations associated with obtaining an IP address for cable modems may be implemented by the network layer software. This may involve the CMTS communicating with a DHCP server (not shown) via a data network interface, for example.

As shown in FIG. 7, at least a portion of the line cards includes interface circuitry for providing an appropriate interface between the host line card, other line cards, and/or the routing engine(s). For example, interface circuitry 733*a* may include interconnect ports coupled to one or more of the point-to-point links 741, 743. According to a specific implementation, the interface circuitry functions as a translator that converts conventional formats of data received at the line cards to a suitable protocol format for transmission from the line card to the appropriate routing engine. In one implementation, the interface circuitry 733*a* may also include circuitry to perform cyclic redundancy code (CRC) generation and checking on packets, along with interconnect format checking.

According to a specific embodiment, the point-to-point links 741, 743 may be configured as clock forwarded links such that each point-to-point link comprises a at least one data wire for transporting data signals and at least one clock wire for carrying clock reference signals. However, it will be understood to those skilled in the art that the clock forwarding technique may be scaled to accommodate other clock forwarding arrangements such as, for example, connections comprising a plurality or data signals and/or clock reference signals. Additionally, according to a specific embodiment, each line card may be configured to provide at least one communication interface between the routing engines (701*a*, 701*b*) and a portion of the cable network. The data network interface 735*a* may couple the routing engine 701*a* to an external data network 755 such as, for example, the Internet.

According to one embodiment, all or selected lines cards, routing engines and/or data network interfaces may be configured to use at least one common dedicated line or backplane (e.g. 745). According to other embodiments, the routing engines 701*a*, 701*b* may have an additional dedicated connection(s) for supporting redundancy. In a specific implementation, the backplane may be configured as an Ethernet medium that is shared by the CMTS. When the line cards are inserted into the backplane, they communicate with the routing engines over the lines 745 in accordance with a "capabilities" exchange that identifies the types of line cards and their various characteristics/parameters.

According to a specific implementation, during initialization of the CMTS, the routing engines 701*a* and 701*b* negotiate for working routing engine status over the backplane. Assertion of working status causes the line cards 731 to configure their respective interface circuitry to communicate with the designated working routing engine (e.g. Routing Engine A 701*a*). The Routing Engine A 701*a* then configures the CMTS and line cards, establishes routing relationships, and initiates traffic forwarding operations. The redundant routing engine 701*b* may complete a self-test and perform initialization of its various functions. The two routing engine assemblies may then exchange conventional negotiation messages (which may include, for example, health and status messages) via the backplane lines 745. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 701*b* detects that the primary routing engine has failed, the redundant routing engine may take over as the new working routing engine, and initiate a "cutover" operation to thereby cause the line card interface circuitry (e.g. 733*a*, 733*b*) to identify and communicate with the new working routing engine 701*b*.

The new working routing engine 701*b* may then access and retrieve state information (such as, for example, telephone call state information, service flow state information, etc.) stored on selected line cards in order to maintain existing service flows.

Prior to a failure situation, the redundant routing engine 701*b* may be configured to monitor the status of the working routing engine 701*a*, and may further be configured or designed to receive updated configuration, transaction and/or state information, which may then be stored in an appropriate location in the redundant routing engine 701*b*.

The line cards may further comprise circuitry for "looping" packets back onto the redundant routing engine 701*b* over the point-to-point links. This allows the redundant routing engine 701*b* to send and receive test packets to evaluate its own operation in addition to the operation of the dedicated lines prior to the occurrence of a system failure.

The synchronization techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 707*a*, 715*a*, etc.) configured to store program instructions for the network operations and other functions of the present invention described herein. The program instructions may specify an operating system and one or more applications, for example. Such memory or memories may also be configured to store data structures, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
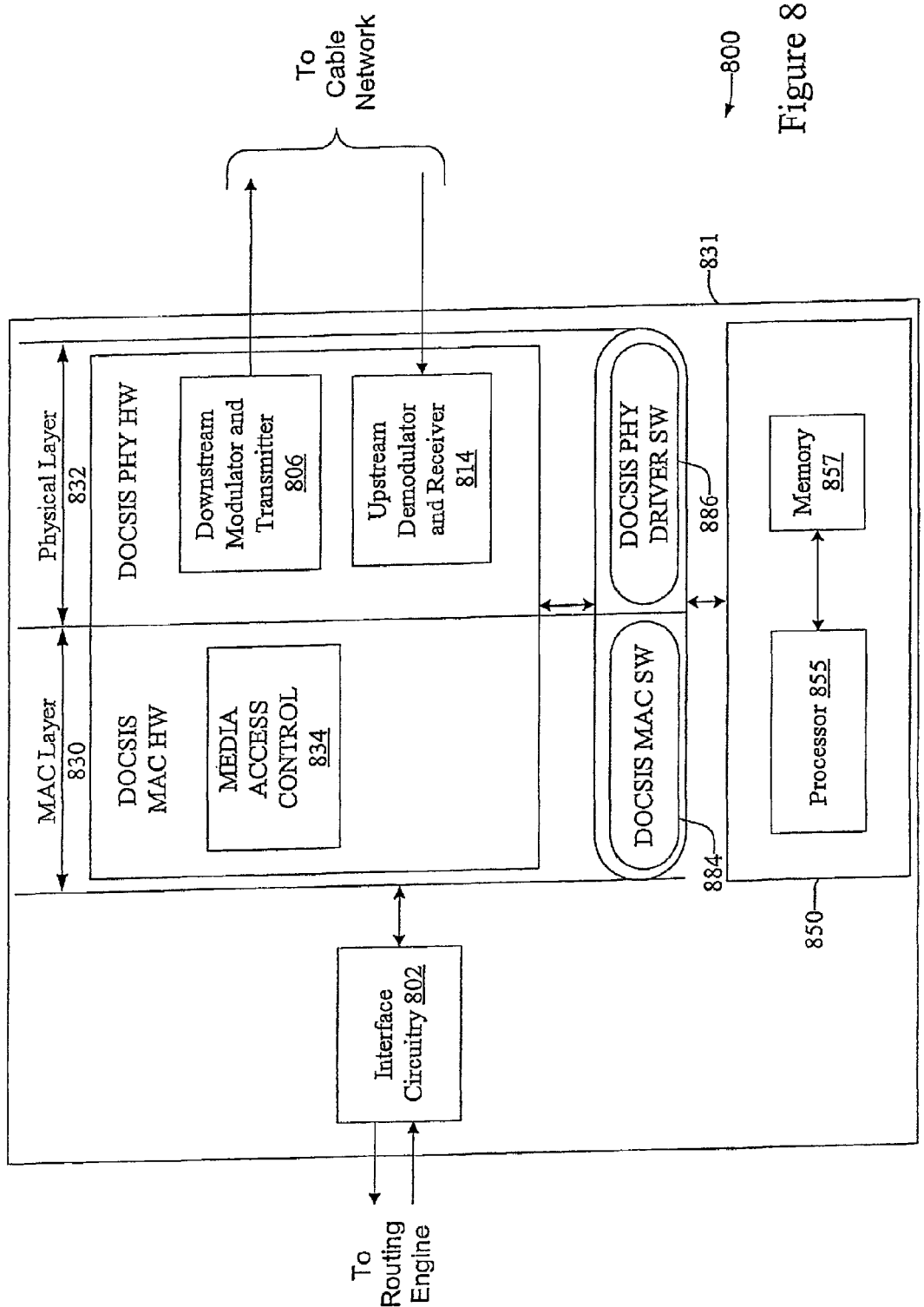
FIG. 8 shows a specific embodiment of a line card 800 which may be used for implementing certain aspects of the present invention.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (packets) arriving via an optical fiber node are converted to electrical signals, and then demodulated by the demodulator/receiver 814. The demodulated information is then passed to MAC layer block 830.

A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, etc. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the technique of the present invention may reside in such memory. In one embodiment, the software entities 882, 884, and 886 are implemented as part of a network operating system running on hardware 850. Preferably, at least a part of the synchronization functionality of this invention are implemented in software as part of the operating system. In FIG. 8, such software may be part of MAC layer software 884, or may be closely associated therewith. Of course, the synchronization logic of the present invention could reside in hardware, software, or some combination of the two.

According to a specific implementation, the procedures typically employed by the CMTS during registration and pre-registration may be performed at the MAC layer of the line card 800. In such an embodiment, most of the registration operations may be performed by the hardware and software provided for MAC layer logic 830.

It will be appreciated that, according to a specific embodiments, at least a portion of functions described herein which are performed by the CMTS (e.g. FIG. 7), line cards (e.g. FIG. 8), or selected components thereof, may be implemented in a centralized CMTS system (e.g. residing the Head End Complex of the cable network, as shown, for example, in FIG. 9), and/or may be implemented at one or more distributed CMTS (DCMTS) systems (e.g. residing at one or more fiber nodes, as shown, for example, in FIG. 10).

Further, it will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein at least a portion of the end nodes and fiber nodes each include local clock circuitry for generating a local clock signal, the method comprising:

provided a common clock reference signal to the local clock circuitry in selected network devices to thereby cause each of the selected network devices to be synchronized to the common clock reference signal;

wherein the common clock reference signal is distributed to the selected network devices including a distributed cable modem termination system (DCMTS) that resides external to the head end complex to thereby cause a local clock signal at the DCMTS to be synchronized to the common clock reference signal.

2. The method of claim 1 wherein the common clock reference signal corresponds to a downstream channel frequency of n MHz.

3. The method of claim 2 wherein the access network is configured to operate at a root clock frequency of m MHz, and wherein a frequency of the common clock reference signal n is an integer multiple of m.

4. The method of claim 2 wherein the frequency n of the common clock reference signal is substantially equal to 20.48 MHz.

5. The method of claim 2 wherein the frequency n of the common clock reference signal is within a frequency range of 5–54 MHz.

6. The method of claim 1 wherein the common clock reference signal is derived from a clock source external to the access network.

7. The method of claim 6 wherein the common clock reference signal is derived from a Stratum 1 clock source.

8. The method of claim 1 wherein said access network is a cable network implemented in accordance with a DOCSIS standardized protocol, and wherein said end nodes are cable modems.

9. The method of claim 8 wherein the plurality of fiber nodes includes a plurality of packet fiber nodes, each packet fiber node including a respective distributed cable modem termination system (DCMTS);
wherein the method further comprises load sharing cable modems across different DCMTS systems.

10. The method of claim 1 wherein the common clock reference signal corresponds to a modulated carrier signal having master timestamp information embedded therein.

11. The method of claim 1 wherein the plurality of fiber nodes includes a plurality of packet fiber nodes, each packet fiber node including a respective distributed cable modem termination system (DCMTS);
the method further comprising synchronizing upstream channels across each of the DCMTS systems.

12. A method for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the at least one packet fiber node including a distributed cable modem termination system (DCMTS), and wherein at least a portion of the end nodes and fiber nodes each include local clock circuitry for generating local clock signals, the method comprising:
receiving a common clock reference signal at a first packet fiber node;
generating, using the common clock reference signal, a local clock signal at the first packet fiber node which is synchronized with the common clock reference signal;
providing the local clock signal to components at the first packet fiber node, including the DCMTS to thereby cause a local clock signal at the DCMTS to be synchronized to the common clock reference signal.

13. The method of claim 12 wherein the common clock reference signal is received via a first downstream channel.

14. The method of claim 12 wherein the common clock reference signal corresponds to a downstream channel frequency of n MHz.

15. The method of claim 14 wherein the access network is configured to operate at a root clock frequency of m MHz, and wherein a frequency of the common clock reference signal n is an integer multiple of m.

16. The method of claim 14 wherein the frequency n of the common clock reference signal is substantially equal to 20.48 MHz.

17. The method of claim 14 wherein the frequency n of the common clock reference signal is within a frequency range of 5–54 MHz.

18. THE method of claim 12 wherein the common clock reference signal is derived from a clock source external to the access network.

19. The method of claim 18 wherein the common clock reference signal is derived from a Stratum 1 clock source.

20. The method of claim 12 wherein said access network is a cable network implemented in accordance with a DOCSIS standardized protocol, and wherein said end nodes are cable modems.

21. The method of claim 12 wherein the common clock reference signal corresponds to a modulated carrier signal having master timestamp information embedded therein.

22. A method for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the at least one packet fiber node including a distributed cable modem termination system (DCMTS), and wherein at least a portion of the end nodes and fiber nodes each include local timestamp circuitry for generating local timestamp information, the method comprising:
receiving timestamp synchronization information at a first packet fiber node; and
generating, using the timestamp synchronization information, local timestamp information at the first packet fiber node which is synchronized with the timestamp synchronization information.

23. The method of claim 22 further comprising providing the timestamp synchronization information to a first DCMTS residing at the first packet fiber node.

24. The method of claim 22 further comprising providing the local timestamp information to a first DCMTS residing at the first packet fiber node.

25. The method of claim 22 further comprising providing the local timestamp information to selected cable modems to thereby cause timestamps generated at each of the selected cable modems to be synchronized with the local timestamp information generated at the first packet fiber node.

26. The method of claim 22 wherein the timestamp synchronization information is received as a modulated carrier sigal having the timestamp synchronization information embedded therein.

27. The method of claim 26 wherein the modulated carrier signal corresponds to a downstream channel frequency of n MHz.

28. The method of claim 26 wherein the access network is configured to operate at a root clock frequency of m MHz, and wherein a frequency of the modulated carrier signal n is an integer multiple of m.

29. The method of claim 26 wherein the frequency n of the modulated carrier signal is substantially equal to 20.48 MHz.

30. The method of claim 26 wherein the frequency n of the modulated carrier signal is within a frequency range of 5–54 MHz.

31. The method of claim 22 wherein said access network is a cable network implemented in accordance with a DOCSIS standardized protocol, and wherein said end nodes are cable modems.

32. A system for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein at least a portion of the end nodes and fiber nodes each include local clock circuitry for generating a local clock signal, the system comprising:
   at lest one CPU;
   memory; and
   at least one interface for communicating with nodes in the access network;
   the system being configured or designed to provide a common clock reference signal to the local clock circuitry in selected network devices to thereby cause each of the selected network devices to be synchronized to the common clock reference signal;
   wherein the common clock reference signal is distributed to the selected network devices including a distributed cable modem termination system (DCMTS) that resides external to the head end complex to thereby cause a local clock signal at the DCMTS to be synchronized to the common clock reference signal.

33. The system of claim 32 wherein the common clock reference signal corresponds to a downstream channel frequency of n MHz.

34. The system of claim 33 wherein the access network is configured to operate at a root clock frequency of m MHz, and wherein a frequency of the common clock reference signal n is an integer multiple of m.

35. The system of claim 33 wherein the frequency n of the common clock reference signal is substantially equal to 20.48 MHz.

36. The system of claim 33 wherein the frequency n of the common clock reference signal is within a frequency range of 5–54 MHz.

37. The system of claim 32 wherein the common clock reference signal is derived from a clock source external to the access network.

38. The system of claim 37 wherein the common clock reference signal is derived from a Stratum 1 clock source.

39. The system of claim 32 wherein the plurality of fiber nodes includes a first RF fiber node and a first packet fiber node, the first packet fiber node including a distributed cable modem termination system (DCMTS);
   the system being further configured or designed to provide the common clock reference signal to the DCMTS to thereby cause a local clock signal at the DCMTS to be synchronized to the common clock reference signal.

40. The system of claim 32 wherein said access network is a cable network implemented in accordance with a DOCSIS standardized protocol, and wherein said end nodes are cable modems.

41. The system of claim 40 wherein the plurality of fiber nodes includes a plurality of packet fiber nodes, each packet fiber node including a respective distributed cable modem termination system (DCMTS);
   the system being further configured or designed to load share cable modems across different DCMTS systems.

42. The system of claim 32 wherein the common clock reference signal corresponds to a modulated carrier signal having master timestamp information embedded therein.

43. The system of claim 32 wherein the plurality of fiber nodes includes a plurality of packet fiber nodes, each packet fiber node including a respective distributed cable modem termination system (DCMTS);
   the system being further configured or designed to synchronize upstream channels across each of the DCMTS systems.

44. The system of claim 32 further comprising a redundant clock circuit configured or designed to generate the common clock reference signal.

45. A system for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the system comprising:
   at lest one CPU;
   memory;
   at least one interface for communicating with nodes in the access network;
   a distributed cable modem termination system (DCMTS); and
   a clock circuit for generating local clock signals;
   the system being configured or designed to receive a common clock reference signal;
   the system being further configured or designed to generate, using the common clock reference signal, a local clock signal which is synchronized with the common clock reference signal;
   the system being further configured or designed to provide the local clock signal to the DCMTS.

46. The system of claim 45 further being configured or designed to receive the common clock reference signal received via a first downstream channel.

47. The system of claim 45 wherein the common clock reference signal corresponds to a downstream channel frequency of n MHz.

48. The system of claim 47 wherein the frequency n of the common clock reference signal is substantially equal to 20.48 MHz.

49. The system of claim 47 wherein the frequency n of the common clock reference signal is within a frequency range of 5–54 MHz.

50. The system of claim 45 wherein said access network is a cable network implemented in accordance with a DOCSIS standardized protocol, and wherein said end nodes are cable modems.

51. The system of claim 45 wherein the common clock reference signal corresponds to a modulated carrier signal having master timestamp information embedded therein.

52. The system of claim 45 further comprising:
a timestamp generator; and
signal modulation circuitry.

53. A system for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, and wherein at least a portion of the end nodes each include local timestamp circuitry for generating local timestamp information, the system comprising:
at lest one CPU;
memory;
at least one interface for communicating with nodes in the access network;
a distributed cable modem termination system (DCMTS); and
a timestamp circuit for generating local timestamp information
the system being configured or designed to receive timestamp synchronization information; and
the system being further configured or designed to generate, using the timestamp synchronization information, local timestamp information which is synchronized with the timestamp synchronization information.

54. The system of claim 53 wherein the system is further configured or designed to provide the timestamp synchronization information to the DCTMS.

55. The system of claim 53 fu wherein the system is further configured or designed to provide the local timestamp information to the DCTMS.

56. The system of claim 53 wherein the system is further configured or designed to provide the local timestamp information to selected cable modems to thereby cause timestamps generated at each of the selected cable modems to be synchronized with the local timestamp information.

57. The system of claim 53 wherein the timestamp synchronization information is received as a modulated carrier signal having the timestamp synchronization information embedded therein.

58. The system of claim 57 further comprising signal modulation circuitry configured or designed to recover the timestamp synchronization information embedded in the modulated carrier signal.

59. The system of claim 57 wherein the modulated carrier signal corresponds to a downstream channel frequency of n MHz.

60. The system of claim 57 wherein the frequency n of the modulated carrier signal is substantially equal to 20.48 MHz.

61. The system of claim 57 wherein the frequency n of the modulated carrier signal is within a frequency range of 5–54 MHz.

62. The system of claim 53 wherein said access network is a cable network implemented in accordance with a DOCSIS standardized protocol, and wherein said end nodes are cable modems.

63. The system of claim 53 further comprising a comparator configured or designed to compare the timestamp synchronization information with the local timestamp information, and further configured or designed to generate an error signal;
wherein the error signal is provided to the timestamp generator to facilitate synchronization of the local timestamp information with the timestamp synchronization information.

64. A computer readable storage medium including computer code for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the at least one packet fiber node including a distributed cable modem termination system (DCMTS), and wherein at least a portion of the end nodes and fiber nodes each include local clock circuitry for generating local clock signals, the computer readable storage medium comprising:
computer code for receiving a common clock reference signal at a first packet fiber node;
computer code for generating, using the common clock reference signal, a local clock signal at the first packet fiber node which is synchronized with the common clock reference signal;
computer code for providing the local clock signal to components at the first packet fiber node, including the DCMTS.

65. The computer readable storage medium of claim 64 wherein the system is further configured or designed to receive the common clock reference signal via a first downstream channel.

66. The computer readable storage medium of claim 64 wherein the access network is configured to operate at a root clock frequency of m MHz, and wherein a frequency of the common clock reference signal n is an integer multiple of m.

67. The computer readable storage medium of claim 64 wherein the common clock reference signal corresponds to a modulated carrier signal having master timestamp information embedded therein.

68. A computer readable storage medium including computer code for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the at least one packet fiber node including a distributed cable modem termination system (DCMTS), and wherein at least a portion of the end nodes and fiber nodes each include local timestamp circuitry for generating local timestamp information, the computer readable storage medium comprising:

computer code for receiving timestamp synchronization information at a first packet fiber node; and computer code for generating, using the timestamp synchronization information, local timestamp information at the first packet fiber node which is synchronized with the timestamp synchronization information.

69. The computer readable storage medium of claim 68 further comprising computer code for providing the timestamp synchronization information to a first DCMTS residing at the first packet fiber node.

70. The computer readable storage medium of claim 68 further comprising computer code for providing the local timestamp information to a first DCMTS residing at the first packet fiber node.

71. The computer readable storage medium of claim 68 further comprising computer code for providing the local timestamp information to selected cable modems to thereby cause timestamps generated at each of the selected cable modems to be synchronized with the local timestamp information generated at the first packet fiber node.

72. The computer readable storage medium of claim 68 wherein the system is further configured or designed to receive the timestamp synchronization information as a modulated carrier signal having the timestamp synchronization information embedded therein.

73. A system for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the at least one packet fiber node including a distributed cable modem termination system (DCMTS), and wherein at least a portion of the end nodes and fiber nodes each include local clock circuitry for generating local clock signals, the system comprising:

means for receiving a common clock reference signal at a first packet fiber node;

means for generating, using the common clock reference signal, a local clock signal at the first packet fiber node which is synchronized with the common clock reference signal;

means for providing the local clock signal to components at the first packet fiber node, including the DCMTS.

74. The system of claim 73 wherein the system is further configured or designed to receive the common clock reference signal via a first downstream channel.

75. The system of claim 73 wherein the access network is configured to operate at a root clock frequency of m MHz, and wherein a frequency of the common clock reference signal n is an integer multiple of m.

76. The system of claim 73 wherein the common clock reference signal corresponds to a modulated carrier signal having master timestamp information embedded therein.

77. A system for synchronizing devices in an access network, the access network including a head end complex and a plurality of end nodes which utilize at least one upstream channel and at least one downstream channel for communicating with the head end complex, the access network further including a plurality of fiber nodes interposed between the head end complex and the plurality of end nodes, each fiber node being configured to communicate with the head end complex and the plurality of end nodes via the upstream and downstream channels, wherein the plurality of fiber nodes includes at least one RF fiber node and at least one packet fiber node, the at least one packet fiber node including a distributed cable modem termination system (DCMTS), and wherein at least a portion of the end nodes and fiber nodes each include local timestamp circuitry for generating local timestamp information, the system comprising:

means for receiving timestamp synchronization information at a first packet fiber node; and means for generating, using the timestamp synchronization information, local timestamp information at the first packet fiber node which is synchronized with the timestamp synchronization information.

78. The system of claim 77 further comprising means for providing the timestamp synchronization information to a first DCMTS residing at the first packet fiber node.

79. The system of claim 77 further comprising means for providing the local timestamp information to a first DCMTS residing at the first packet fiber node.

80. The system of claim 77 further comprising means for providing the local timestamp information to selected cable modems to thereby cause timestamps generated at each of the selected cable modems to be synchronized with the local timestamp information generated at the first packet fiber node.

81. The system of claim 77 wherein the system is further configured or designed to receive the timestamp synchronization information as a modulated carrier signal having the timestamp synchronization information embedded therein.

* * * * *